US012652087B2

(12) United States Patent
Hajri et al.

(10) Patent No.: US 12,652,087 B2
(45) Date of Patent: Jun. 9, 2026

(54) UPLINK FREQUENCY SELECTIVE PRECODER

(71) Applicant: Nokia Technologies Oy, Espoo (FI)

(72) Inventors: Salah Eddine Hajri, Antony (FR);
Frederick Vook, Naperville, IL (US);
William Hillery, Naperville, IL (US)

(73) Assignee: Nokia Technologies Oy, Espoo (FI)

( * ) Notice: Subject to any disclaimer, the term of this
patent is extended or adjusted under 35
U.S.C. 154(b) by 366 days.

(21) Appl. No.: 18/259,740

(22) PCT Filed: Dec. 10, 2021

(86) PCT No.: PCT/EP2021/085177
§ 371 (c)(1),
(2) Date: Jun. 28, 2023

(87) PCT Pub. No.: WO2022/152475
PCT Pub. Date: Jul. 21, 2022

(65) Prior Publication Data
US 2024/0072857 A1      Feb. 29, 2024

(30) Foreign Application Priority Data
Jan. 14, 2021    (EP) .................................... 21151548

(51) Int. Cl.
*H04B 7/0456*          (2017.01)
*H04L 25/02*           (2006.01)
(52) U.S. Cl.
CPC ......... *H04B 7/046* (2013.01); *H04L 25/0228*
(2013.01)
(58) Field of Classification Search
CPC .... H04B 7/046; H04B 7/0456; H04B 7/0404;
H04L 25/0228
See application file for complete search history.

(56) References Cited

U.S. PATENT DOCUMENTS 9,521,622 B2    12/2016  Yang et al.
10,624,118 B2    4/2020  Park et al.
(Continued)

FOREIGN PATENT DOCUMENTS

WO          2019/178867 A1      9/2019

OTHER PUBLICATIONS

Notice of Allowance received for corresponding European Patent
Application No. 21151548.1, dated Jan. 17, 2025, 7 pages.
(Continued)

*Primary Examiner* — Ayman A Abaza
*Assistant Examiner* — Alyssa Williams
(74) *Attorney, Agent, or Firm* — Lippes Mathias LLP

(57) ABSTRACT

Disclosed herein is an apparatus that receives, from a
network, an uplink reference signal configuration, receives,
from the network, an indication on an uplink reference
signal precoding method, receives, from the network, a
downlink reference signal, estimates uplink channel wide-
band information based on the received downlink reference
signal, transmits, to the network, an uplink reference signal
based on the received uplink reference signal configuration,
the estimated uplink channel wideband information and the
indicated uplink reference signal precoding method,
receives, from the network, uplink frequency selective pre-
coding information, the uplink frequency selective precod-
ing information having been determined based on the uplink
reference signal and the indicated uplink reference signal
precoding method, and constructs an uplink frequency selec-
tive precoder based on the estimated uplink channel wide-
band information and the received uplink frequency selec-
tive precoding information.

11 Claims, 7 Drawing Sheets

(56)                 References Cited

U.S. PATENT DOCUMENTS

| | | | | |
|---|---|---|---|---|
| 2011/0171949 | A1 | 7/2011 | Liao et al. | |
| 2019/0028164 | A1 | 1/2019 | Li et al. | |
| 2019/0103907 | A1 | 4/2019 | Yang et al. | |
| 2019/0140714 | A1 | 5/2019 | Tan et al. | |
| 2019/0174527 | A1* | 6/2019 | Park | H04L 5/0046 |
| 2019/0190569 | A1* | 6/2019 | Nayeb Nazar | H04B 7/0639 |
| 2019/0207731 | A1* | 7/2019 | Park | H04B 7/0486 |
| 2019/0280751 | A1 | 9/2019 | Tsai et al. | |
| 2020/0119783 | A1 | 4/2020 | Liu et al. | |
| 2020/0136690 | A1* | 4/2020 | Noh | H04L 5/0094 |
| 2020/0196388 | A1 | 6/2020 | Zhang et al. | |
| 2020/0252241 | A1 | 8/2020 | Park et al. | |
| 2021/0006302 | A1 | 1/2021 | Nayeb Nazar et al. | |
| 2021/0297119 | A1* | 9/2021 | Sundararajan | H04B 7/0404 |
| 2022/0069880 | A1* | 3/2022 | Rahman | H04B 7/0481 |
| 2022/0352932 | A1* | 11/2022 | Malek Mohammadi | H04B 7/0632 |
| 2023/0064117 | A1* | 3/2023 | Zhong | H04L 25/0202 |
| 2023/0078895 | A1* | 3/2023 | Wu | H04L 25/0226 370/329 |
| 2023/0239106 | A1* | 7/2023 | Manolakos | H04L 5/0035 370/329 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification Group Radio Access Network; NR; Physical layer procedures for data (Release 16)", 3GPP TS 38.214, V16.2.0, Jun. 2020, pp. 1-163.

"3rd Generation Partnership Project; Technical Specification Group Radio Access Network; NR; Multiplexing and channel coding (Release 16)", 3GPP TS 38.212, V16.2.0, Jun. 2020, pp. 1-151.

"3rd Generation Partnership Project; Technical Specification Group Radio Access Network; NR; User Equipment (UE) radio access capabilities (Release 16)", 3GPP TS 38.306, V16.1.0, Jul. 2020, pp. 1-106.

"Further Enhancements on MIMO for NR", 3GPP TSG RAN Meeting #89e, RP-20xxxx, Agenda: 9.8.1, Samsung, Sep. 14-18, 2020, pp. 1-17.

"TPMI Indication for Frequency Selective UL Precoding", 3GPP TSG RAN WG1 Meeting #90, R1-1714135, Agenda: 6.1.2.1.2, InterDigital Inc, Aug. 21-25, 2017, 4 pages.

Extended European Search Report received for corresponding European Patent Application No. 21151548.1, dated Jun. 18, 2021, 11 pages.

"On frequency selective precoding for UL-MIMO", 3GPP TSG-RAN WG1 #89, R1-1708900, Agenda: 7.1.2.1.8, Nokia, May 15-19, 2017, 7 pages.

International Search Report and Written Opinion received for corresponding Patent CooperationPCT/EP2021/085177, dated Mar. 14, 2022, 16 pages.

* cited by examiner

200

210    220    230    240    250

300

UE                                                                gNB

Higher layer configuration (310)

DCI triggering aperiodic CSI and aperiodic SRS (320)

321

CSI-RS (330)

CSI measurement (340)

322

CSI report (350)

SRS based on wideband information from CSI-RS (360)

SRS measurement (370)

UL DCI scheduling PUSCH and containing UL FS PMI (380)

400

410

Transmit UL FS PMI configuration in RRC

420

Transmit aperiodic CSI-RS

430

Receive CSI report(s)

440

Receive aperiodic SRS

450

Compute UL FS PMI

460

Transmit UL FS PMI

500

510 Receive UL FS PMI configuration in RRC

520 Receive aperiodic CSI-RS

530 Compute CSI report(s) and detect UL channel WB information assuming partial reciprocity 540 Transmit CSI report(s)

550 Transmit aperiodic SRS percoded based on estimated UL WB information

560 Receive UL FS PMI

570 Construct FS precoder for UL transmission

UPLINK FREQUENCY SELECTIVE PRECODER

RELATED APPLICATION

This application was originally filed as PCT Application No. PCT/EP2021/085177 on Dec. 10, 2021, which claims priority from EP Application Serial No. 21151548.1, filed on Jan. 14, 2021, each of which is incorporated herein by reference in its entirety.

TECHNOLOGICAL FIELD

The disclosure is related to communication networks, such as wireless radio networks comprising base stations and mobile devices, such as user equipments, communicating with each other, or mobile devices communicating with each other. Specifically, the disclosure pertains to the precoding in multiple input multiple output (MIMO) systems and, more specifically, to the determination and transmission of uplink precoding information, in particular uplink frequency selective precoding information.

BACKGROUND

The present disclosure is related but not limited to communication networks as defined by the 3GPP standard, such as the 5G standard, also referred to as New Radio, NR.

5G NR makes extensive use of beamforming, both in uplink and downlink. As user equipments (UEs) and base stations (gNBs) are equipped with multiple antenna elements or antenna arrays, the transmitted signal can be focused efficiently on intended targets and the receiver can efficiently reject interference. Since gNBs capabilities are typically higher than UEs, due to several factors, including, size, energy consumption, cost and computational power, the beamforming capabilities of the gNB are superior and exploit sophisticated mechanisms for indicating precoding information, such as PMI codebooks, e.g. Type II, port selection Type II, enhanced Type II, enhanced port selection Type II. With the aforementioned advanced PMI codebooks, the gNB acquires the ability to accurately pre-code (e.g. beamform) downlink channels (e.g. PDCCH, PDSCH), taking into consideration the frequency selectivity of the channel and multi-user MIMO (MU-MIMO) pairing.

However, when it comes to the uplink transmission, the precoding capabilities of the UE are still falling behind. Indeed, in 5G NR, two uplink transmission schemes are supported, namely, codebook-based and non-codebook-based transmission. Both schemes, however, do not consider frequency selective precoding in the uplink. This means that, when the uplink channel is highly frequency selective, the UE fails to adapt to e.g. deep fades which results in degrading performance and oblige it to resort to conservative link adaptation.

While 5G NR already provides two possible UL transmission schemes, namely, codebook-based and non-codebook-based transmission, it does not account for the channel frequency selectivity. Specifically, in the scenarios where the wireless channel is not dominated by a line of sight link, we may expect high frequency selectivity with potentially deep fades. Completely overlooking this aspect will degrade the achievable performance. Consequently, a frequency selective UL precoder would benefit UEs capable of digital beamforming, enabling them to achieve higher throughput and better link adaption.

SUMMARY OF SOME EXEMPLARY EMBODIMENTS

Certain embodiments of the present disclosure may have the effect of providing a framework for the construction of frequency selective UL precoder. Specifically, certain embodiments of the present disclosure exploit the inherent partial channel reciprocity for uplink and downlink channels. Certain embodiments of the present disclosure may in particular make the needed payload in dynamic DL signaling or PDSCH manageable so that fast-changing fading conditions in the channel can be accounted for.

According to a first exemplary aspect, a user equipment for a frequency division duplex, FDD, system, is disclosed, comprising means for:

receiving, from a network, an uplink reference signal configuration;

receiving, from the network, an indication on an uplink reference signal precoding method;

receiving, from the network, a downlink reference signal;

estimating uplink channel wideband information based on the received downlink reference signal;

transmitting, to the network, an uplink reference signal based on the received uplink reference signal configuration, the estimated uplink channel wideband information and the indicated uplink reference signal precoding method;

receiving, from the network, uplink frequency selective precoding information, the uplink frequency selective precoding information having been determined based on the uplink reference signal and the indicated uplink reference signal precoding method; and constructing an uplink frequency selective precoder based on the estimated uplink channel wideband information and the received uplink frequency selective precoding information.

According to the first exemplary aspect, a method, performed at least by a user equipment, is also disclosed, the method comprising:

receiving, from a network, an uplink reference signal configuration;

receiving, from the network, an indication on an uplink reference signal precoding method;

receiving, from the network, a downlink reference signal;

estimating uplink channel wideband information based on the received downlink reference signal;

transmitting, to the network, an uplink reference signal based on the received uplink reference signal configuration, the estimated uplink channel wideband information and the indicated uplink reference signal precoding method;

receiving, from the network, uplink frequency selective precoding information, the uplink frequency selective precoding information having been determined based on the uplink reference signal and the indicated uplink reference signal precoding method;

constructing an uplink frequency selective precoder based on the estimated uplink channel wideband information and the received uplink frequency selective precoding information.

According to a second exemplary aspect, a network entity for a frequency division duplex, FDD, system, is disclosed, comprising means for:

transmitting, to a user equipment, an uplink reference signal configuration;

transmitting, to the user equipment, an indication on an uplink reference signal precoding method;

transmitting, to the user equipment, a downlink reference signal;

receiving, from the user equipment, an uplink reference signal transmitted based on the uplink reference signal configuration, the indicated uplink reference signal precoding method and uplink channel wideband information estimated based on the downlink reference signal;

determining uplink frequency selective precoding information based on the received uplink reference signal and on the indicated uplink reference signal precoding method; and transmitting, to the user equipment, the uplink frequency selective precoding information, so that the user equipment can construct an uplink frequency selective precoder based on the estimated uplink channel wideband information and the uplink frequency selective precoding information.

According to the second exemplary aspect, a method, performed at least by a network entity, is also disclosed, the method comprising:

transmitting, to a user equipment, an uplink reference signal configuration;

transmitting, to the user equipment, an indication on an uplink reference signal precoding method;

transmitting, to the user equipment, a downlink reference signal;

receiving, from the user equipment, an uplink reference signal transmitted based on the uplink reference signal configuration, the indicated uplink reference signal precoding method and the uplink channel wideband information estimated based on the downlink reference signal;

determining uplink frequency selective precoding information based on the received uplink reference signal and on the indicated uplink reference signal precoding method; and transmitting, to the user equipment, the uplink frequency selective precoding information, so that the user equipment can construct an uplink frequency selective precoder based on the estimated uplink channel wideband information and the uplink frequency selective precoding information.

The user equipment of the first exemplary aspect may be stationary device or a mobile device. The user equipment may in particular be a mobile device, such as a smart phone, a tablet, a wearable, a smartwatch, a low power device, an IoT device or the like. The user equipment is in particular capable of MIMO operation in an FDD system. Generally, the user equipment may also be any other device enabled for communication with a respective communication network, such as a vehicle, for instance a car. A user equipment or mobile station may be understood as any device used to communicate with a respective network. The user equipment of the first exemplary aspect may be in direct or indirect communication with a network entity of the communication network, such as a network entity of the second exemplary aspect, or another user equipment.

The network entity of the second exemplary aspect may be an electronic device, such as an entity of the radio access network or the core network of communication system. The network entity is in particular capable of MIMO operation in an FDD system. For instance, the network entity may be or comprise a base station (e.g. a gNB, eNodeB, BS or the like) or be in communication with a base station. Generally, the network entity may be a hardware or software component implementing a certain functionality. In an example, the network entity may be an entity as defined by the 3GPP 5G standard. Accordingly, while the network entity may be understood to be implemented in or be a single device or module, the network entity may also be implemented across or comprise multiple devices or modules. As such, the network entity may in particular be implemented in or be a stationary device. Multiple network entities of the first exemplary aspect may in particular establish a communication system or network, which may in particular be a New Radio (NR) or 5G system or any other mobile communications system defined by a past or future standards, in particular successors of the present 3GPP standards. The network entity of the second exemplary aspect may be in direct or indirect communication with the user equipment of the first exemplary aspect.

The means of any of the disclosed apparatuses can be implemented in hardware and/or software. They may comprise one or multiple modules or units providing the respective functionality. They may for instance comprise at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

Thus, according to a respective exemplary aspect of the present disclosure, there is also disclosed a respective apparatus (i.e. a network entity and a user equipment) comprising at least one processor and at least one memory including computer program code, the at least one memory and the computer program code configured to, with the at least one processor, cause an apparatus at least to perform and/or to control the method according to a respective exemplary aspect of the present disclosure.

Any of the above-disclosed apparatuses may be a module or a component for a device, for example a chip. The disclosed apparatus may comprise the disclosed components, for instance means, processor, memory, or may further comprise one or more additional components.

The method of a respective aspect may for instance be performed and/or controlled by the apparatus according to the respective aspect, i.e. network entity or the mobile device, respectively. Generally, however, a respective method may also be performed and/or controlled by more than one apparatus, for instance by a user equipment and a network working together.

According to the first and second exemplary aspects of the present disclosure, there is in each case also disclosed a computer program, the computer program when executed by a processor of an apparatus causing said apparatus to perform a method according to the first or second aspect respectively.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

There is also disclosed a system comprising a user equipment of the first aspect and a network entity of the second aspect working together for performing aspects of the disclose.

In the following, further exemplary features and exemplary embodiments of the different aspects of the present disclosure will be described in more detail.

According to the second exemplary aspect, the network entity may transmit, to the user equipment, an uplink reference signal configuration. Correspondingly, according to the first exemplary aspect, the user equipment may receive, from the network, the uplink reference signal configuration. The reference signal configuration may in particular be transmitted from the network entity to the user equipment via a higher layer signal, for instance via the RRC layer or via a MAC control element, CE. The reference signal configuration may be understood as a general configuration so that the user equipment receives a general configuration needed for transmitting one or multiple uplink reference signals. For instance, the uplink reference signal configuration may be a specific configuration for transmitting an uplink reference signal on a specific occasion or the uplink reference signal configuration may be a general configuration to be used on multiple occasions for multiple uplink reference signals (e.g. until another configuration is provided). For instance, information comprised by the uplink reference signal configuration may be resource information, port information and/or information on the mapping to the radio resources to be used for transmitting the uplink reference signal, such as an uplink reference signal resource set, a number of uplink reference signal ports and/or an uplink reference signal frequency density.

According to the second exemplary aspect, the network entity may transmit, to the user equipment, an indication on an uplink reference signal precoding method. Correspondingly, according to the first exemplary aspect, the user equipment may receive, from the network, the indication on an uplink reference signal precoding method. The indication on an uplink reference signal precoding method may allow for a mutual understanding of the network entity and the user equipment of a method or scheme used for precoding the uplink reference signal. For instance, the precoding method may in particular indicate whether precoding takes place with respect to the spatial domain, the frequency domain or both the spatial and frequency domain. Spatial precoding may be understood to refer to a precoding based on the channel spatial support (i.e; spatial beams). Frequency precoding may be understood to be a precoding based on the channel delay support or equivalently the frequency domain compression components. Accordingly, the different precoding schemes may in the following also be referred to as precoding based on the channel spatial and/or delay supports.

For instance, the SRS precoding scheme may be selected based on the SRS reliability (e.g., by comparing the RSRP and/or RSRQ of the SRS vs a threshold), on the intended use of the SRS (e.g. based on the usage IE in RRC SRS-ResourceSet IE) and/or the number of user equipments performing uplink reference signal transmissions at the same time instance which impact the interference conditions and consequently the SRS measurements reliability (i.e. SRS interference).

Precoding may be understood to allow multi-stream or multi-layer transmission with multi-antenna wireless communication. For instance, in point-to-point systems, precoding may be understood so that multiple data streams are emitted from the transmit antennas with independent and appropriate weightings. This may allow for maximizing the link throughput at the receiver. For instance, for multi-user MIMO, the different data streams are intended for different users and precoding may then allow to maximize e.g. a measure of the total throughput for all users.

Precoding may in particular allow for (digital) beamforming in the spatial domain, i.e. to use the antenna array for transmitting one or multiple spatially directive signals. This may in particular useful for line-of-sight (LoS) communication. However precoding may also be used when transmitting to a non-line-of-sight (NLoS) user (the transmitted signal may then not have a clear angular directivity). Instead precoding may be understood to allow the emitted signal to be matched to the multipath propagation so that the multipath components that reach the user add constructively.

According to the second exemplary aspect, the network entity may transmit, to the user equipment, a downlink reference signal. Correspondingly, according to the first exemplary aspect, the user equipment may receive, from the network, the downlink reference signal. The UE may use the downlink reference signal to figure out downlink power (i.e, the power of the signal from the network entity), by measuring the power of this reference signal. Also, the downlink reference signal may provide a channel estimation of the downlink channel for the user equipment. Simply put, the reference signal is made up of data known to both the base station and the UE, so that the UE can figure out how the communication channel influences (e.g. distorts) the signal by comparing the decoded received reference signal and the original predefined reference signal, and use the result of this comparison to equalize (post process) the received user data. However, in the context of the present disclosure and as will be explained in more detail below, the downlink reference signal can also advantageously be used by the user equipment for estimating channel information on the uplink channel by assuming and exploiting the uplink and downlink channel to be at least partially reciprocal.

Thus, according to the first exemplary aspect, the user equipment may estimate uplink channel wideband information based on the received downlink reference signal. The proposed scheme exploits the inherent (partial) reciprocity in FDD systems, so that estimating uplink channel information by means of a downlink signal is possible. Partial reciprocity in particular refers to the fact that the spatial and delay supports of the uplink and downlink channels may be assumed to be identical or equivalent in FDD systems, at least with a certain range of duplexing distance (i.e. the difference in frequency between the frequencies used for the uplink and the downlink, i.e. between the uplink and downlink carriers).

For instance, the user equipment may measure the downlink reference signal (or certain properties or characteristics thereof) and deduce from the received downlink reference signal channel information (in particular wideband information) of the uplink channel which are assumed to be reciprocal. This information may include the channel spatial support and delay support. In this way, the deduced channel information, such as the wideband part of the channel information, does not need to be transmitted from the network to the UE.

The disclosure exploits the fact that frequency selective information changes at a faster rate than the channel wideband delay and spatial supports, and the partial reciprocity is used in order to avoid transmitting the wide band part of the uplink precoder. Thus, the frequency selective information can be transmitted e.g. by dynamic downlink signaling or PDSCH (which are a suitable options to convey this fast changing information), while the wideband information does not need to be transmitted with this signaling. This in turn makes the needed payload in dynamic downlink signaling or PDSCH manageable. Consequently, the described approach achieves the critical aim of keeping the payload of the frequency selective precoding information at a minimum, given the large demand for dynamic downlink signaling functionalities.

According to the first exemplary aspect, the user equipment may transmit, to the network, an uplink reference signal based on the received uplink reference signal configuration, the estimated uplink channel wideband information, and the indicated uplink reference signal precoding method. Correspondingly, according to the second exemplary aspect, the network entity may receive, from the user equipment, an uplink reference signal transmitted based on the uplink reference signal configuration, the indicated uplink reference signal precoding method, and the uplink channel wideband information estimated based on the downlink reference signal. Thus, the transmission of uplink reference signal by the user equipment not only utilizes the uplink reference signal configuration, but also the uplink channel wideband information (i.e. the uplink reference signal was in particular precoded based on the estimated wideband information), which was previously estimated from the received downlink reference signal. Moreover, the UE may employ the uplink reference signal precoding method which has previously been indicated by the network. Thus, as explained above, the used uplink reference signal at this stage may be precoded solely based on the channel spatial support, solely on the channel delay support, or on both the spatial and delay supports of the channel. Upon reception of the uplink reference signal the network entity can perform measurements over the uplink reference signal resource elements and use the measurement results for determining uplink frequency selective precoding information, as explained below.

According to the second exemplary aspect, the network entity may then determine uplink frequency selective precoding information based on the received uplink reference signal and on the indicated uplink reference signal precoding method. As the network capabilities are typically superior with respect to computational power, the network entity can efficiently compute the (typically fast changing) frequency selective precoding information. All the information that the network needs to perform the uplink precoder calculations are provided by the uplink reference signal and by the configuration of the used uplink reference signal for this purpose (e.g. the resource sets, the number of ports, the frequency density, etc). Nevertheless, the employed precoding method will have an impact on how the uplink reference signal should be processed at the network entity. Consequently, it is advantageous if there is a understanding between the network entity and UE on the used precoding scheme or option of uplink reference signal, namely i) solely based on the channel spatial support, ii) solely based on the channel delay support (i.e. the frequency domain compression components), or iii) based on both the spatial and delay supports of the channel.

Basically, the uplink frequency selective precoding may be any information, which allows the UE (together with the wideband information) to construct the frequency selective uplink precoder. The uplink frequency selective precoding information may for instance comprise or be representative of (frequency selective, e.g. sub-band) amplitude coefficients, co-phasing coefficients, precoding matrix elements and/or a precoding matrix indicator, PMI. The information may be comprised by the uplink frequency selective precoding information explicitly or implicitly (e.g. based on a codebook).

According to the second exemplary aspect, the network entity may transmit, to the user equipment, the uplink frequency selective precoding information, so that the user equipment can construct an uplink frequency selective precoder based on the estimated uplink channel wideband information and the received uplink frequency selective precoding information. Correspondingly, according to the first exemplary aspect, the user equipment may receive, from the network, the uplink frequency selective precoding information, wherein the uplink frequency selective precoding information has been determined based on the uplink reference signal and the indicated uplink reference signal precoding method, and the user equipment may then construct an uplink frequency selective precoder based on the estimated uplink channel wideband information and the received uplink frequency selective precoding information.

As already explained, the uplink frequency selective precoding information may for instance comprise or be representative of amplitude coefficients, co-phasing coefficients, precoding matrix elements and/or a precoding matrix indicator, PMI. The frequency selective precoding information may also be codebook based. A precoder (or a matrix element of a precoder matrix) may for instance be calculated by the UE based on a product of a wideband amplitude (which is already known to the UE as it has been estimated by the UE based on the downlink reference signal), a frequency selective amplitude per sub-band or per FD component (e.g. indicated by the uplink frequency selective precoding information) and a co-phasing coefficient (e.g. indicated by the uplink frequency selective precoding information).

Accordingly, as already mentioned above, the frequency selective information may be transmitted e.g. by dynamic downlink signaling or PDSCH, while the wideband information does not need to be transmitted with this signaling. This in turn makes the needed payload in dynamic downlink signaling or PDSCH manageable and the described approach achieves the critical aim of keeping the payload of the frequency selective precoding information at a minimum, given the large demand for dynamic downlink signaling functionalities.

A so constructed frequency selective uplink precoder can then be used by the user equipment for an uplink transmission. Thus, according to the first aspect, the method may further comprise (or the user equipment may comprise means for) transmitting an uplink signal precoded with the constructed frequency selective uplink precoder.

Overall, the suggested approach provides a comprehensive framework for the construction of a frequency selective uplink precoder. The proposed scheme exploits the inherent partial reciprocity in FDD systems within a given range of duplexing distance (i.e. difference in frequency between the UL and DL carriers). The partial reciprocity (which can be assumed to be applicable in the majority of practically deployed systems) can advantageously be used in order to avoid transmitting the wideband part of the uplink precoder, making the needed payload in dynamic downlink signaling or PDSCH manageable.

While the assumed partial reciprocity generally holds for FDD systems, the validity of this assumption may depend on the duplexing distance and how fast the channel wideband information changes, for example due to user equipment mobility. With respect to the latter, the timing offset in particular between downlink reference signal and the associated uplink reference signal transmission may need to be managed carefully. Thus, the network entity may transmit to the user equipment an indication of a timing offset for transmission of the uplink reference signal. Likewise, the user equipment may further comprise means for receiving, from the network, an indication of a timing offset for transmission of the uplink reference signal, wherein the uplink reference signal is transmitted based on the received indication of the timing offset.

For instance, the uplink reference signal is transmitted at a time determined based on the received indication of the timing offset. For instance, the timing offset may comprise or indicate a slot and/or symbol offset. The indication of a timing offset may generally indicate one or multiple possible timing offsets. For instance, the indication of a timing offset may indicate a timing offset from a (e.g. predefined) set of configured timing offsets. For instance, the timing offset may be configured in order to indicate the time interval between the downlink reference signal and the uplink reference signal that are used for the frequency selective uplink precoder computations. In an example, the timing offset may further take into consideration the propagation delay between the user equipment and the network. The timing offset may be configured such that the time between the downlink reference signal and the uplink reference signal is limited so that it can be ensured that the assumed concept of reciprocity for the uplink and the downlink channel holds. Indicating a specific timing offset may further have the effect of associating a downlink reference signal with a certain uplink reference signal, so that it becomes unambiguous, which pair of downlink and uplink reference signals shall be used for the frequency selective uplink precoder computation.

The timing offset may refer to a timing offset between the time of the reception of the downlink reference signal and the time of the transmission of the uplink reference signal. Alternatively, the timing offset may refer to a timing offset between the time of the reception of downlink control information triggering the transmission of the downlink reference signal and the time of the transmission of the uplink reference signal. In each case there may be the effect of ensuring that the assumed concept of reciprocity for the uplink and the downlink channel holds and a downlink reference signal may be associated with a certain uplink reference signal.

Generally, the uplink reference signal and the downlink reference signal to be used for the proposed scheme may also be associated or linked with each other by other means (e.g. an identifier, for instance), in order to avoid any ambiguity between the network entity and the user equipment when it comes to downlink and uplink reference signal usage, timing and triggering.

In an example, the indication of the timing offset may be transmitted (and received, respectively) via a higher layer. For instance, the indication of the timing offset may be transmitted (and received, respectively) via the RRC layer. In an example, the indication of the timing offset may be transmitted (and received, respectively) via downlink control information, DCI. In another example, the indication of the timing offset may be transmitted (and received, respectively) via a MAC configuration element, MAC CE. Specifically in case of transmitting the timing offset via RRC or MAC CE, one or more offsets may be conveyed or indicated. A DCI message or MAC CE may preferably be used to select a specific timing offset from a list of offsets.

In one example, the indication of the timing offset may select a timing offset from a list of multiple timing offsets.

For instance, the indication of the timing offset may refer to a number of slots or symbols. For instance, the indication of the timing offset may refer to a number of (e.g. valid) uplink occasions. For instance, the uplink reference signal may be transmitted (e.g. exactly or at least or at most) after the indicated offset, the number of slots or symbols, or the number of uplink occasions.

In an example, the indication of the timing offset comprises an indication of the downlink reference signal. By indicating the downlink reference signal (or the DCI triggering the downlink reference signal), it can be ensured that the respective downlink reference can be unambiguously identified, so as to avoid any confusion in case multiple downlink reference signals may be transmitted or triggered in a certain period of time.

The indicated uplink reference signal precoding method may be one of a set of precoding methods. The set of precoding methods may comprise a precoding method (solely) based on an estimated channel spatial support of the uplink channel. The set of precoding methods may comprise a precoding method (solely) based on an estimated channel delay support of the uplink channel. The set of precoding methods may comprise a precoding method based on both an estimated channel spatial support and an estimated channel delay support of the uplink channel.

The network entity may further comprise means for transmitting an uplink frequency selective precoding configuration via a higher layer. Determining the uplink frequency selective precoding information may be based on the uplink frequency selective precoding configuration. Accordingly, the user equipment may further comprise means for receiving an uplink frequency selective precoding configuration via a higher layer. Constructing the uplink frequency selective precoder may further be based on the received uplink frequency selective precoding configuration. The uplink frequency selective precoding configuration may comprise a basic precoding configuration (which is not provided as part of e.g. the uplink frequency selective precoding information) to be used for constructing the uplink frequency selective precoder, so that the user equipment and the network have a common understanding of the relevant parameters used for the precoder construction, as will be explained in more detail below.

The uplink frequency selective precoding configuration may for instance comprise information on a number of uplink reference signal ports to be used for constructing the uplink frequency selective precoder. For instance, the uplink frequency selective precoding configuration may comprise information on a number of bits for quantization of amplitude scaling coefficients. The uplink frequency selective precoding configuration may comprise information on a number of bits for quantization of co-phasing coefficients. The uplink frequency selective precoding configuration may comprise information on a port selection sampling size. The uplink frequency selective precoding configuration may comprise information on a number of frequency domain components. The uplink frequency selective precoding configuration may comprise information on a number of non-zero coefficients for amplitude scaling and/or co-phasing coefficients. The uplink frequency selective precoding configuration may comprise information on an uplink frequency selective precoder configuration index.

In an example, the downlink reference signal is a channel state information reference signal, CSI-RS.

The CSI-RS, which is received by the UE, may be used to estimate the channel and report channel state information back to the network. Specifically during MIMO operations, different antenna approaches may be used based on the carrier frequency. For instance, at lower frequencies, the system may use a modest number of active antennas for MU-MIMO and add FDD operations. The CSI-RS may be used for RSRP measurements used during mobility and beam management and/or for frequency/time tracking. A CSI-RS may be configured specific to a UE, but multiple users may share the same resource. A CSI-RS can be periodic, semi-persistent or aperiodic (e.g. due to DCI triggering). A CSI-RS may be transmitted in bursts of two or four symbols which are spread across one or two slots.

Alternatively, the downlink reference signal may be a synchronization signal block, SSB. An SSB may comprise a primary synchronization signal (PSS), a secondary synchronization signal (SSS) and a physical broadcast channel (PBCH). An SSB may occupy 4 OFDM symbols in the time domain and spread over 240 subcarriers (20 RBs) in the frequency domain.

In another alternative, the downlink reference signal may be a demodulation reference signal, DMRS. A DMRS may be of mapping type A or B and/or of configuration type 1 or 2, for instance. A DMRS may function as a reference signal for decoding PDSCH.

Generally, the downlink reference signal may be a periodic, aperiodic or semi-persistent reference signal. A periodic reference signal may in particular be transmitted automatically and repeatedly with a configured periodicity, as provided in RRC configuration. An aperiodic reference signal may in particular be (only) transmitted after being individually triggered (e.g. by a DCI message). A semi-persistent reference signal may need to be activated but is transmitted with a configured periodicity until it is deactivated.

The uplink reference signal may in particular be a sounding reference signal, SRS. An SRS may be transmitted at the last symbol of an uplink slot with full system band area. An SRS may be transmitted in hopping mode. An SRS may be configured by an RRC message (e.g. SIB2, RRC Connection Setup, RRC Connection Reconfiguration) carrying SRS configuration information.

As with the downlink reference signal, the uplink reference signal may generally be a periodic, aperiodic or semi-persistent reference signal.

The uplink frequency selective precoding information may be transmitted (and received, respectively) via dynamic downlink signaling. For instance, the uplink frequency selective precoding information may be transmitted via a physical downlink control channel, PDCCH. For instance, a DCI (scheduling an uplink or downlink) may be used to convey the frequency selective precoding information. This may mean that corresponding fields in the DCI may be needed. Alternatively, a MAC CE or other PDSCH resource may be used to transit the uplink frequency selective precoding information. In one example, dynamic downlink signaling may be used to indicate PDSCH resource(s) for transporting the uplink frequency selective precoding information payload. This may be advantageous in case the PDCCH resources are insufficient to convey the uplink frequency selective precoding information. In an example, downlink scheduling DCI, e.g. DCI format 1_1 in NR, would be used to indicate the PDSCH that actually contains the payload of the uplink frequency selective precoding information. For example, a one-bit field in DCI may indicate whether the PDSCH scheduled by that DCI contains an UL precoder indication or not.

The uplink frequency selective precoding information may indicate various information e.g. by explicitly comprising the respective information or by indirectly indicating the information (e.g. via a codebook). For instance, the uplink frequency selective precoding information may comprise an indication of one or more amplitude scaling coefficients (e.g. for one or more sub-bands or frequency domain components) for the construction of the uplink frequency selective precoder. An amplitude scaling coefficient may be provided for each beam, polarization, layer, sub-band and/or frequency domain component. The uplink frequency selective precoding information may comprise an indication of one or more co-phasing coefficients for the construction of the uplink frequency selective precoder. A co-phasing coefficient may be provided for each beam, polarization, layer, sub-band and/or frequency domain component. The uplink frequency selective precoding information may comprise an indication (e.g. a port selection vector) of selected ports for constructing the uplink frequency selective precoder.

For instance, the uplink frequency selective precoding information may comprise a bitmap indicating selected ports to be used for constructing the uplink frequency selective precoder. For example, the uplink frequency selective precoding information may comprise a combinatorial indicator indicating selected ports to be used for constructing the uplink frequency selective precoder. For example, the uplink frequency selective precoding information may comprise an indication of a first selected port to be used for constructing the uplink frequency selective precoder.

For instance, the uplink frequency selective precoder (or each matrix element of the precoder) w may be determined based on (e.g. a product of) a port selection vector v, a wideband amplitude $p^{(WB)}$, a sub-band amplitude $p^{(NB)}$ and a co-phasing coefficient $\varphi$, e.g. based on the relation $w \sim v \cdot p^{(WB)} \cdot p^{(NB)} \cdot \varphi$. To provide an example, the user equipment may construct the uplink frequency selective precoder based on the equation $$w_{r,l} = \sum_{i=0}^{L-1} v_{i_{1,1}s+i} \cdot p_{r,l,i}^{(WB)} \cdot p_{r,l,i}^{(SB)} \cdot \varphi_{r,l,i}$$

wherein $w_{r,l}$ is the precoder for polarization r on layer l,

L is the number of selected ports (i.e. beams) per polarization, s is the port selection sampling size, $v_{i_{1,1}s+i}$ is the port selection vector (first port is $i_{1,1}s$), $$p_{r,l,i}^{(WB)}$$

is the wideband beam amplitude for beam i on polarization r and layer l, $$p_{r,l,i}^{(SB)}$$

is the sub-band beam amplitude for beam i on polarization r and layer l, $\varphi_{r,l,i}$ is the co-phasing coefficient for beam i on polarization r and layer l.

Determining the uplink frequency selective precoding information by the network entity may for instance take into account an uplink reference signal resource set, a number of uplink reference signal ports, and/or an uplink reference signal frequency density. This information may be exchanged between the network entity and the user equipment via the sounding reference signal configuration.

Determining the uplink frequency selective precoding information by the network entity may for instance take into account an uplink reference signal port selection, an uplink reference signal resource indication, a frequency domain component indication, a strongest port indication, a strongest coefficient indication, and/or one or more co-phasing coefficients and/or scaling coefficients. This information may be derived by the network entity from the sounding reference signal received from the user equipment.

Determining of the uplink frequency selective precoding information may comprise comparing a number of uplink reference signal ports and a number of ports to be used for constructing the uplink frequency selective precoder; and in case the number of ports to be used for constructing the uplink frequency selective precoder is lower than the number of uplink reference signal ports, selecting ports to be used for constructing the uplink frequency selective precoder from the uplink reference signal ports. Therein, the ports to be used for constructing the uplink frequency selective precoder may be selected based on a predefined rule.

Generally, upon reception of the uplink reference signal, the network entity performs measurements over the uplink reference signal resource elements. At this stage, two cases may be identified, depending on the number of ports that will be used for the actual computation of the uplink frequency selective precoding information.

In case the number of ports used for the uplink frequency selective precoding information is lower than the number of received uplink reference signal ports, the network entity may select a subset of uplink reference signal ports. The network entity may select the ports freely or according to a given rule, e.g. select a number of consecutive ports with a given sampling step of ports. For instance, in case the selection is free, the network entity is only constrained by the number of ports to be selected. The indication of the selected ports may be realized via a bitmap or a combinatorial indicator. For instance, in case the network entity is constrained to select consecutive ports, it may only indicate the first selected port to the user equipment. The user equipment can then deduce the rest of the selected ports based on a predefined rule, e.g. in addition to the indication of the first port, based on a port sampling step and a total number of ports to be selected. The indication of the first selected port may be conveyed to the user equipment using an uplink reference signal indicator (e.g. SRI for SRS), if a single port per resource is configured. Alternatively, when multiple ports are configured per resource, the first selected port may be indicated via a port selection vector. However, other rules in port selection and indication are possible.

In case the number of ports used for the uplink frequency selective precoding information is equal to the number of received uplink reference signal ports, there is no need to perform a port selection and all uplink reference signal ports will be used in computing the uplink frequency selective precoding information.

From a practical implementation point of view, it is advantageous when a UE, for performing frequency selective precoding, can maintain gain and phase coherence across its transceivers over sufficiently long time, as issues such as relative phase discontinuity may deteriorate its precoding capabilities whether it is performing wideband or frequency selective precoding. A UE may be able to maintain coherence across its transceivers or a subset of its transceivers over time thanks to different proprietary solutions. In one example of the present disclosure, the proposed approach for constructing the frequency selective uplink precoder may thus only be used when the UE indicates the capability of maintain coherence across its transceivers or a subset of its transceivers over time (e.g. over a certain amount of time).

It is to be understood that the presentation of the embodiments disclosed herein is merely by way of examples and non-limiting.

Herein, the disclosure of a method step shall also be considered as a disclosure of means for performing the respective method step. Likewise, the disclosure of means for performing a method step shall also be considered as a disclosure of the method step itself.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

The following description serves to deepen the understanding of the present disclosure and shall be understood to complement and be read together with the description of example embodiments of the present disclosure as provided in the above SUMMARY section of this specification.

While the specific radio system in the examples below is 5G, this is only to be considered a non-limiting example.

Figure 1:
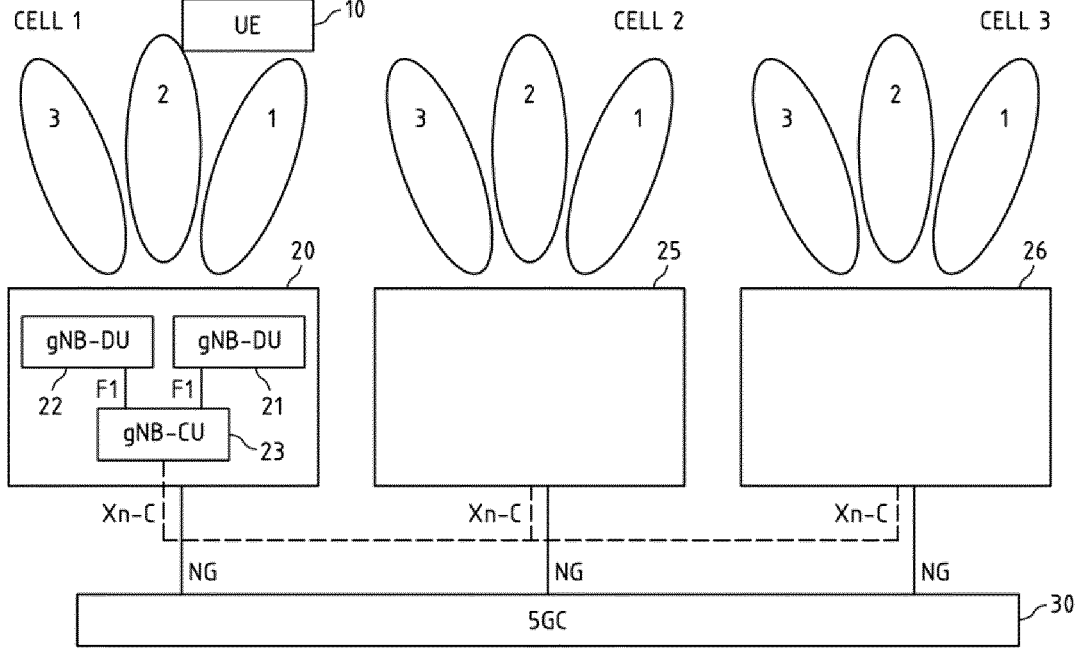
FIG. 1 is a schematic diagram illustrating an example radio environment in which exemplary embodiments of the present disclosure may be performed.

FIG. 1 shows an example environment, in which the present disclosure may be applied. FIG. 1 shows a 5G communication network, which introduces the New Radio technology and also an architecture for which the different sublayers of the RAN may be split into two logical entities in a communication network control element (like a BS or gNB), which are referred to as distributed unit (DU) and central unit (CU). For example, the CU is a logical node that controls the operation of one or more DUs over a front-haul interface (referred to as F1 interface). The DU is a logical node including a subset of the gNB functions, depending on the functional split option.

As shown in FIG. 1, a user equipment (UE) 10, as an example of a user equipment of the first exemplary aspect of the present disclosure, is connected to a cell 1 of a base station, a gNB 20 via a communication beam of the cell 1. In the example shown in FIG. 1, the gNB is provided with a CU 23 and two DUs 21 and 22 being connected to the CU 23 by a F1 interface. Furthermore, as shown in the example of FIG. 1, there is a plurality of further cells to which the UE 10 can connect. Similarly to cell 1, cells 2 and 3 are controlled by gNB 25 and 26, respectively, and each provides a plurality of beams 1 to 3. The different beams of a 5G network may be used for beam diversity or beam hopping.

As shown in FIG. 1, each base station or gNB of the cells is connected to a core network, such as a 5GC, via respective interfaces, indicated as NG interfaces. Furthermore, each gNB of the cells is connected with each other by means of a specific interface, which is referred to e.g. as an Xn-C interface.

Any of these network entities, such as the gNB, gNB-DU, gNB-CU and/or 5GC, may individually or together be an example of a network entity according to the first aspect of the invention.

In the following examples, the uplink reference signal will be an SRS, the downlink reference signal will be a CSI-RS. However, other reference signals may be utilized as well. While the network entity will inter alia be referred to as a gNB, this is not intended to be limiting and other network entities are possible as well.

Moreover, in the following exemplary description, the frequency selective uplink precoding information will be assumed to be in the form of a frequency selective uplink precoding matrix indicator (UL FS PMI), without limiting the frequency selective uplink precoding information thereto.

Generally, in order to enable the construction of a reliable uplink frequency selective precoder at the UE, in FDD systems, the gNB needs to provide the UE with, at least, the frequency selective information following an uplink reference signal (UL RS) measurements, as will be described further below.

For a better understanding of the context of the present disclosure, two principles for uplink transmission in 5G NR shall briefly be explained. Basically, there are two uplink transmission schemes supported, namely, codebook-based transmission and non-codebook-based transmission. The UE can be configured with the uplink transmission scheme using the higher layer parameter txConfig in pusch-Config which can be set to 'codebook' or 'nonCodebook'. If the UE is not configured with txConfig, downlink control information format 0_1 or 0_2 are not expected for scheduling PUSCH. For both codebook and non-codebook-based transmission, PUSCH may be scheduled by downlink control information format 0_0, 0_1, 0_2 or semi-statically configured.

In case the UE is configured with codebook-based transmission and PUSCH is scheduled by DCI format 0_1, 0_2 or semi-statically configured, the UE chooses its PUSCH precoder based on SRI, TPMI and the transmission rank. When PUSCH is scheduled by DCI format 0_1 or format 0_2, SRI, TPMI and the transmission rank are given by the DCI fields SRS resource indicator, precoding information and number of layers. In case of semi-statically configured PUSCH, the SRI, TPMI and transmission rank are given by srs-ResourceIndicator and precodingAndNumberOfLayers in configuration. The uplink transmission precoder is selected from the uplink codebook that has a number of antenna ports equal to higher layer parameter nrofSRS-Ports in SRS-Config. The UE determines its codebook subsets based on TPMI and upon the reception of higher layer parameter codebookSubset in pusch-Config for PUSCH associated with DCI format 0_1 and codebookSubset-ForDCIFormat0_2 in pusch-Config for PUSCH associated with DCI format 0_2.

For non-codebook based transmission, the UE can determine its PUSCH precoder and transmission rank based on the SRI when multiple SRS resources are configured, where the SRI is given by the SRS resource indicator in DCI for DCI format 0_1 and DCI format 0_2, or the SRI is given by srs-ResourceIndicator for semi-statically configured PUSCH. The UE shall use one or multiple SRS resources for SRS transmission, where the maximum number of SRS resources which can be configured to the UE for simultaneous transmission in the same symbol and the maximum number of SRS resources are UE capabilities. Only one SRS port for each SRS resource is configured. Only one SRS resource set can be configured with usage set to 'nonCodebook', in SRS-ResourceSet and the maximum number of SRS resources that can be configured for non-codebook-based uplink transmission is 4. The UE may calculate the precoder used for the transmission of SRS based on measurement of a configured associated NZP CSI-RS resource. A UE can be configured with only one NZP CSI-RS resource for the SRS resource set with higher layer parameter usage set to 'nonCodebook'. The UE transmits PUSCH using the same antenna ports as the SRS port(s) in the SRS resource(s) indicated by SRI(s) given by DCI format 0_1 or by config-uredGrantConfig, for semi-statically configured PUSCH.

The present disclosure now provides a comprehensive framework for the construction of a frequency selective uplink (FS UL) precoder. The proposed scheme exploits the inherent partial reciprocity in FDD systems within a given range of duplexing distance (difference in frequency between the UL and DL carriers). Partial reciprocity refers to the fact that the spatial and delay supports (spatial beams and frequency domain compression components) of the UL and DL channels may be assumed to be equivalent in FDD systems within a certain range of duplexing distance (which is however applicable in the majority of practical deployed systems). As will become apparent in more detail further below, in the framework of this disclosure, partial reciprocity will in particular be used in order to avoid transmitting the wideband part of the uplink precoder, making the needed payload in dynamic DL signaling or PDSCH manageable. This is of relevance, as frequency selective information changes at a faster rate than the wideband channel delay and spatial supports and therefore dynamic downlink signaling is advantageous to convey the frequency selective information. Specifically in 5G NR, signaling frequency selective information may be done via PDCCH (e.g. DCI) or PDSCH (e.g. MAC CE). However, due to the higher reliability of PDCCH, DCI based indication is more robust. In any case, it is preferred to maintain the payload of the frequency selective information to a minimum, given the large demand for dynamic DL signaling functionalities.

An example of the present disclosure will now be described in more detail with respect to FIG. 2-5.

Figure 2:
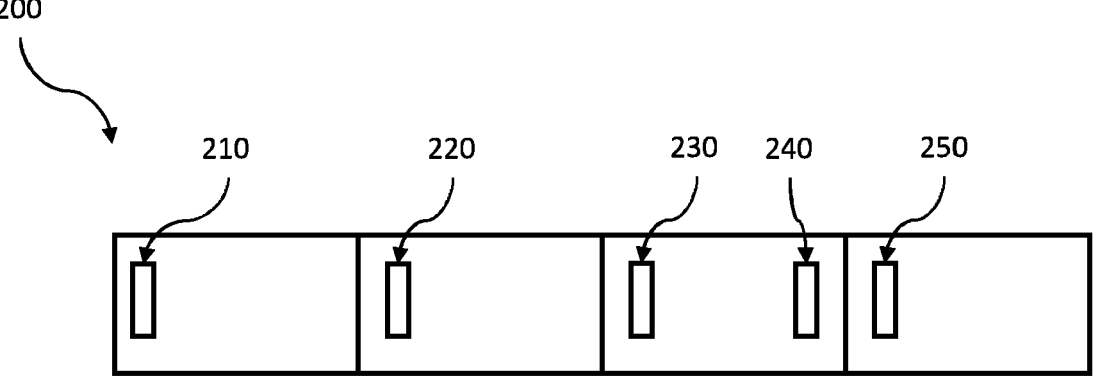
FIG. 2 is a schematic illustration of resources transmitted between the UE and the gNB in an example of the present disclosure.
Figure 3:
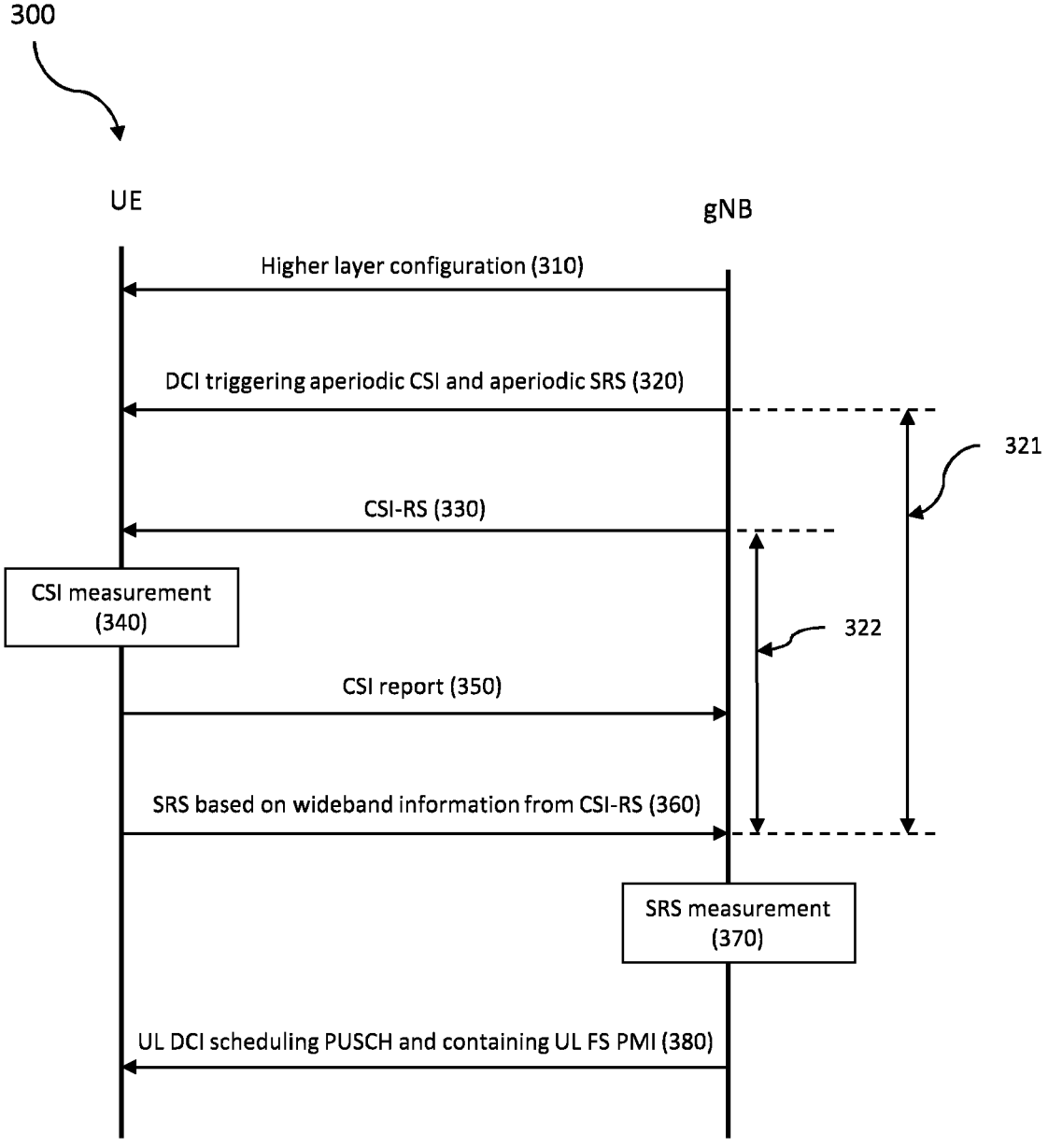
FIG. 3 is an exemplary signaling chart between the UE and the gNB.
Figure 4:
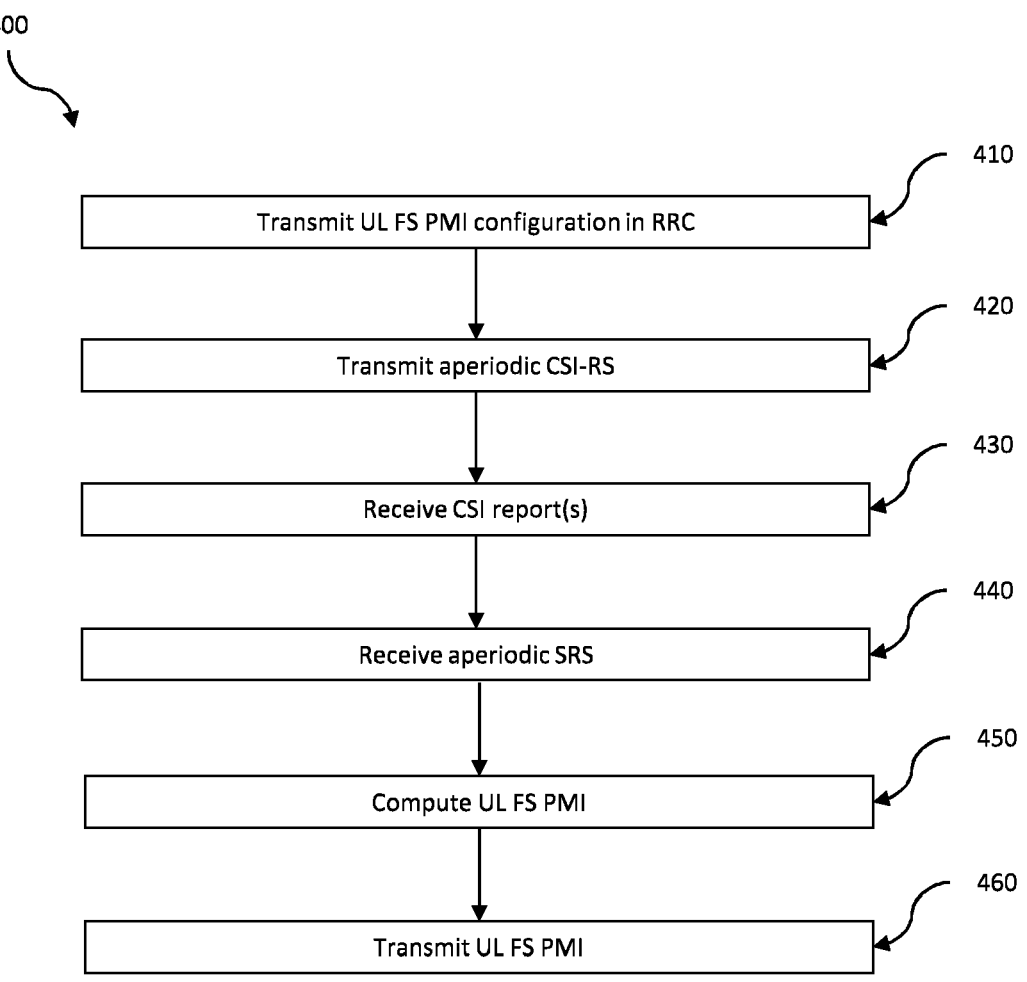
FIG. 4 is diagram illustrating an exemplary embodiment of a method according to the second aspect of the present disclosure.
Figure 5:
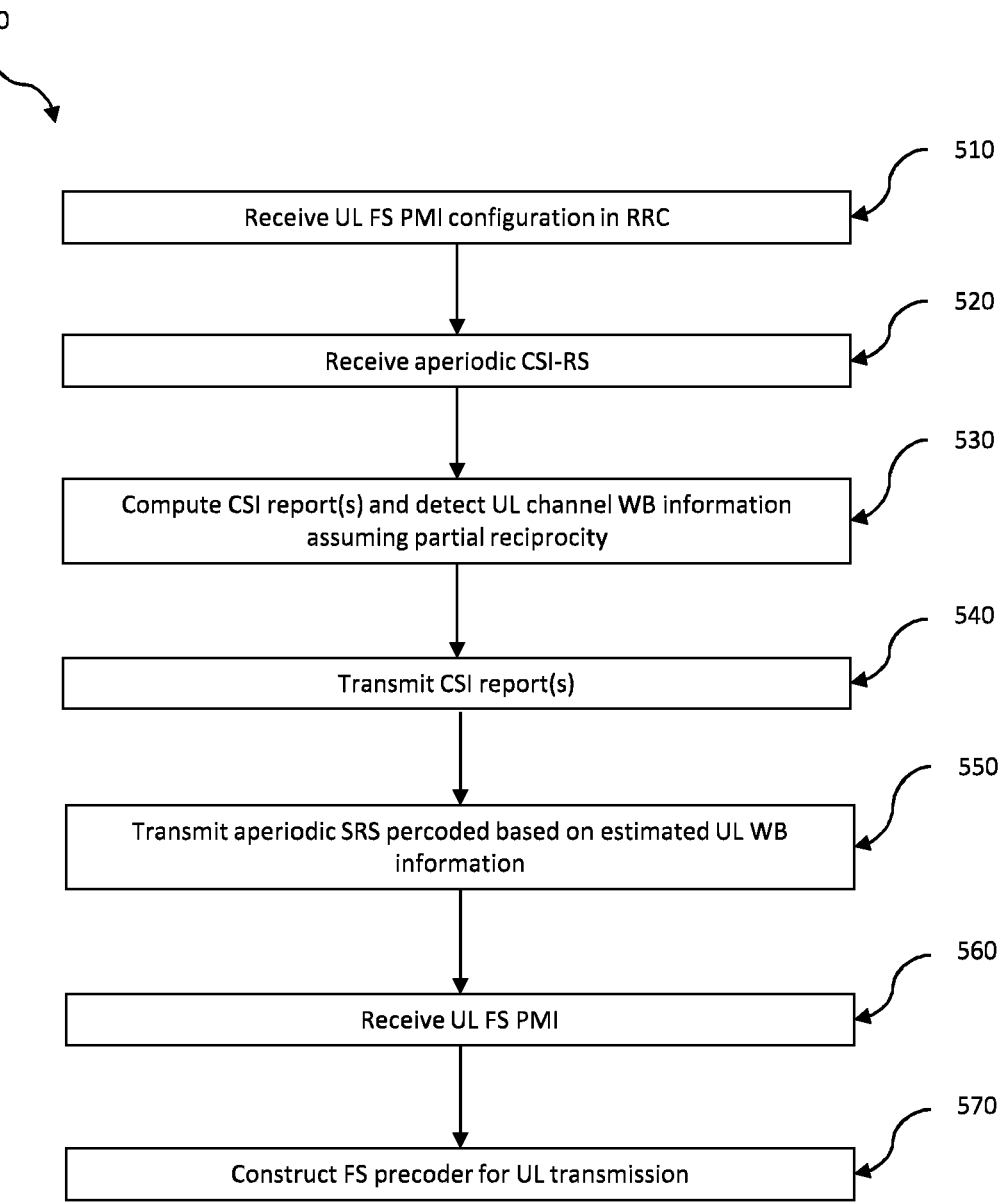
FIG. 5 is a diagram illustrating an exemplary embodiment of a method according to the first aspect of the present disclosure.

Therein, FIGS. 2 and 3 show signaled resources 200 and a signaling chart 300 between the UE and gNB according to an example embodiment of the proposed scheme with frequency selective uplink precoder indication in DCI. FIGS. 4 and 5 show diagrams 400, 500 illustrating the signaling from the perspective of the gNB (FIG. 4) and UE (FIG. 5), respectively, in order to derive the UL frequency selective precoder and indicate it to the UE.

In this exemplary embodiment, an uplink reference signal is configured as part of a higher layer configuration via RRC (action 310). This configuration comprises various parameters for transmitting an uplink reference signal, such as an uplink reference signal resource set, a number of uplink reference signal ports, and/or an uplink reference signal frequency density.

Moreover, together therewith or separate therefrom, an appropriate uplink frequency selective precoding configuration is transmitted from the gNB to the UE, which is also provided via the RRC higher layer in the described example (actions 310, 410, 510). Generally, the configuration may be provided by means of a new dedicated Information element (IE) or additional new fields of any existing IE. The information that may be specified via the RRC configuration includes, but is not limited to the number of ports used for the UL FS PMI computation;

the number of bits used to quantize the amplitude scaling and/or co-phasing coefficients;

the port selection sampling size (if needed), and, in case of additional frequency domain (FD) compression, a number of FD components, a number of non-zero coefficients and/or a selected PMI configuration index; and a precoding format indicator (spatial domain only, delay/frequency domain only, both spatial and delay/frequency domain), in order to indicate the UL RS precoding method, which may be in the form of codebook type field.

The gNB then triggers an aperiodic CSI and an aperiodic SRS (210, action 320). That the UL RS is to be used for the described approach may also be signaled (e.g. with the configuration or triggering of the UL RS). It is again highlighted that the proposed scheme may however be used with any time behaviour of both the UL and DL RS, including periodic, aperiodic and semi-persistent reference signals. It is generally only desired to avoid ambiguities between the gNB and the UE when it comes to timing aspects and to which RS resource sets would be used for the proposed scheme, given that UL RS and DL RS may be used for multiple operations in the network. For instance, it is reasonable to link the DL RS and UL RS that may be used for the proposed scheme (e.g. in RRC). This would avoid any ambiguity between the gNB and UE when it comes to DL/UL RS usage, timing and triggering. For instance, the DL RS (e.g. CSI-RS or SSB) resources may be associated with the UL RS resources. Alternatively, a timing offset between the triggering of the DL RS and the subsequent SRS transmission (321) or the transmission or reception of the DL RS and the subsequent SRS transmission (322) may be signaled to the UE.

In any case, the gNB transmits and the UE receives and measures characteristics of the downlink reference signal (220, actions 330, 340, 420, 520), in this case an aperiodic CSI-RS (periodic, aperiodic or semi-persistent CSI-RS or SSBs is also possible).

The UE does not only compute and transmit the CSI report to the gNB (230, actions 350, 430, 530, 540), but also derives, as part action 530, from the received DL RS, the wideband information of the UL channel which are assumed to be reciprocal to the those of the DL channel. This may include the channel spatial domain (spatial beams) and frequency domain supports (FD components).

The UE transmits the UL RS (e.g. periodic, aperiodic or semi-persistent SRS) that was pre-coded based on the estimated channel wideband information and the indication from the gNB regarding the precoding method, i.e. spatial domain support, delay domain support or both (240, actions 360, 550). The used UL RS at this stage may be pre-coded solely based on the channel spatial support, delay support or both.

Upon reception of the UL RS at the gNB (action 440), the gNB performs measurements over the UL RS resource elements (action 370). It is noted, that from the perspective of the gNB, there is generally no need to know the exact transmit weights that were used by the UE for the UL RS transmission. All the information that the gNB needs in order to perform the FS UL PMI calculations are provided in the configuration of the used UL RS for this purpose (such as resource sets, number of ports, frequency density, etc). Nevertheless, as already indicated above, the precoding method will have an impact on how the UL RS should be processed at the gNB. Consequently, there is the above described understanding between the gNB and UE on the precoding option of UL RS, namely, i) solely based on the channel spatial support, ii) solely based on the channel delay support (the frequency domain compression components), iii) based on both the spatial and delay supports of the channel.

At this stage, two cases may be identified, depending on the number of ports that have been used for the transmission of the UL RS on the one hand, and that will be used for the actual UL FS PMI computation on the other hand:

i) In case the number of ports used in the UL FS PMI is lower than the number of received UL RS ports, the gNB selects a subset of UL RS ports according to a given configuration (number of PMI spatial domain and frequency domain beams/components, port sampling step, etc). The gNB may select the ports freely or according to a given rule, e.g., select a number of consecutive ports with a given sampling step of ports.

In case the selection is free, the gNB is only constrained by the number of ports to select. The indication of the selected ports to the UE may be done via a bitmap or a combinatorial indicator.

In case the gNB is constrained to e.g. select consecutive ports, it may only indicate the first selected port to the UE. The UE can then deduce the rest of the selected ports from the indication of the first port, the port sampling step and the total number of ports to be selected. The indication of the first selected port may be conveyed to the UE using an UL RS resource indicator (e.g. SRI for SRS), if a single port per resource is configured. Alternately, when multiple ports are configured per resource, the first selected port may be indicated via a port selection vector.

Other rules in port selection and indication may also be used.

ii) In case the number of ports to be used for the UL FS PMI is equal to the number of received UL RS ports, there is no need to perform port selection and all UL RS ports/REs will be used in computing the UL FS PMI.

Once the gNB identifies the UL RS ports that will be used for UL FS PMI computation, the gNB computes the UL FS PMI components (action 450), i.e. in particular amplitude scaling and co-phasing coefficients per port, per sub-band or FD component, depending on the configuration and precoding option. In case UL RS is precoded only based on spatial domain wideband information, the gNB would be measuring linear combination coefficients per port per sub-band, basically measuring a compressed channel in spatial domain. Alternatively, when a precoding scheme based on both spatial and delay supports is used, the gNB pre-processes the UL RS resource elements (e.g. summing REs of a given port across sub-bands) and would be measuring the linear combination coefficients of a compressed channel in both spatial and frequency domain.

The gNB conveys the UL FS PMI (i.e. in particular the amplitude scaling and co-phasing coefficients) to the UE (250, actions 380, 460, 560), e.g. in dynamic downlink signaling via PDCCH or PDSCH. For instance, a control channel (via UL scheduling and/or DL scheduling DCI) or a shared channel (vie MAC CE) may be used to convey the frequency selective precoder information and, eventually, partial wideband information (i.e. the selected ports) to the UE. For this, new or dedicated fields in DCI and/or MAC CE may be used.

Alternatively, other downlink shared channel (e.g. PDSCH) payload may be used to convey the UL FS PMI. In this case, the gNB uses dynamic downlink signaling (e.g. via DCI or MAC CE) to the UE for sending the PDSCH resources transporting the UL precoder information. This may be useful e.g. in case PDCCH resources are insufficient to convey the UL precoder frequency selective information itself. E.g. DL scheduling DCI, e.g. DCI format 1_1 in NR, or MAC CE may be used to indicate the PDSCH that contains the precoder payload. For example, a one bit field in DCI may indicate if the scheduled PDSCH by that DCI contains an UL precoder indication or not.

These approaches of utilizing dynamic downlink signaling in order to either transmit the FS UL PMI itself or at least indicate the resources for transmission of the FS UL PMI to the UE have the advantage of adapting to the fast-changing fading conditions in the channel.

The UE will then construct the FS UL precoder (action 570) based in particular on the wideband information derived from the DL RS, the received information on frequency selective beam amplitudes and co-phasing coefficients, and further information available at the UE due to the received UL RS and FS UL PMI configurations.

As an example, the resulting UL precoder may be determined (here for the case when no FD compression or precoding is considered and in case the ports are selected in order with a given port sampling size) as follows:

$$w_{r,l} = \sum_{i=0}^{L-1} v_{i_{1,1}s+i} \cdot p_{r,l,i}^{(WB)} \cdot p_{r,l,i}^{(SB)} \cdot \varphi_{r,l,i}$$

wherein $w_{r,l}$ is the precoder for polarization r on layer l,

L is the number of selected ports (i.e. beams) per polarization, s is the port selection sampling size, $v_{i_{1,1}s+i}$ is the port selection vector (first port is $i_{1,1}$s), $$p_{r,l,i}^{(WB)}$$

is the wideband beam amplitude for beam i on polarization r and layer l, $$p_{r,l,i}^{(SB)}$$

is the sub-band beam amplitude for beam i on polarization r and layer l, $\varphi_{r,l,i}$ is the co-phasing coefficient for beam i on polarization r and layer l.

The constructed frequency selective uplink precoder can then be used by the UE for an uplink transmission of e.g. user payload via a shared channel (PUSCH).

As an illustrative example, the required payload in DL dynamic signaling shall be estimated. In the example, the payload required to convey an UL FS PMI according to the described approach with the following configuration is calculated:

Frequency domain compression as in enhanced Type II and enhanced Port selection Type II with the selection of X FD components out of a codebook of size Y;

Strongest coefficient indicator in the FD component 0;

Bitmap to indicate the location of K non-zero coefficients;

$N_p$ for phase quantization;

$N_a$ for amplitude quantization; and

L ports per polarization.

Considering the above for the UL FS PMI parameters, the total payload (in bits) that the gNB needs to convey to the UE in dynamic DL signaling may be given by the following formula:

$$\log_2(2L)+(K-1)\times(N_p+N_a)+\log_2(C(Y,X))+X\times 2L \text{ (bits).}$$

In case, the UL FS PMI is not compressed in the frequency domain, the total payload that the gNB needs to convey to the UE in dynamic DL signaling may be given by the following formula, for N s sub-bands/PRB groups:

$$\log_2(2L)+(2L\times N_s-1)\times(N_p+N_a) \text{ (bits).}$$

A further aspect to be considered for the proposed scheme relying on partial reciprocity of FDD systems (depending on the duplexing distance), is the timing offset between DL RS and associated UL RS transmission, which should be managed carefully and optimally also taking into consideration the propagation delay between the UE and gNB. As already mentioned above, a timing offset (e.g. slot or symbol offset) may be configured in order to indicate the time interval between the DL RS (or its triggering) and UL RS (cf. 321, 322 in FIG. 3) that are used for frequency selective uplink precoder computations. Thus, the reference for the SRS timing starts either from the triggering DCI (action 320 in FIG. 3) or from the time of the first or last symbol of PDSCH containing the CSI-RS (action 330 in FIG. 3) or from the time of the CSI-RS. The timing offset may be indicated in DCI, MAC CE or RRC, for instance. Via RRC or MAC CE one or more offsets may be conveyed. DCI or MAC CE may also be used to select a specific offset from a list of offsets. The offsets may be expressed in number of slots, symbols or number of valid uplink occasions, for instance. With this information the UE can determine the timing of the transmission of uplink reference signal.

From a practical implementation point of view, it is advantageous for a UE to maintain gain and phase coherence across its transceivers over a sufficiently long time, as issues such as relative phase discontinuity may hinder its precoding capabilities for wideband or frequency selective precoding. For instance, the field pa-PhaseDiscontinuityImpacts in the IE FeatureSetUplink (used by UE to indicate supported features on the carriers corresponding to one band entry in a band combination) indicates incapability motivated by impacts of PA phase discontinuity with overlapping transmissions with non-aligned starting or ending times or hop boundaries across carriers for intra-band EN-DC, intra-band CA and FDM based ULSUP. As a UE may be able to maintain coherence across its transceivers over time due to proprietary solutions, it may then indicate this capability.

The proposed approach of the present disclosure is preferably used only when the UE indicates such capability.

Figures 6, 7:
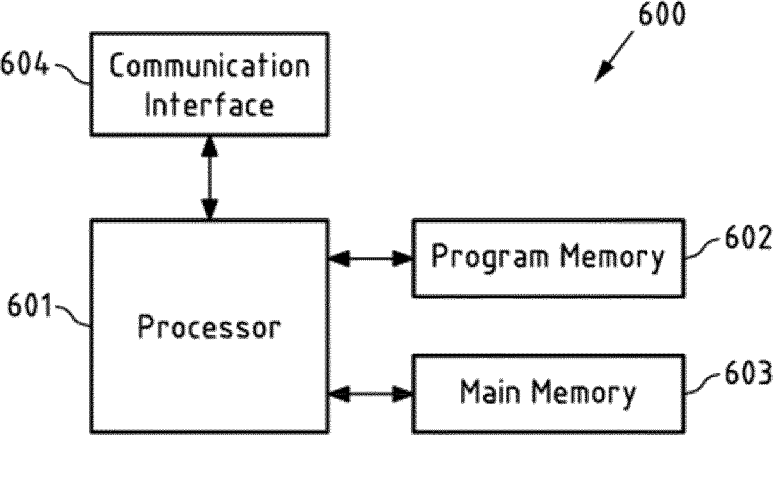
FIG. 6 is a block diagram of an exemplary embodiment of an apparatus according to the present disclosure.
FIG. 7 is a block diagram of an exemplary embodiment of a base station.

Turning now to FIG. 6, there is shown a block diagram of an exemplary embodiment of a UE 600 according to the present disclosure, such as UE 10 of FIG. 1. For example, UE 600 may be one of a smartphone, a tablet computer, a notebook computer, a smart watch, a smart band, an IoT device or a vehicle.

UE 600 comprises a processor 601. Processor 601 may represent a single processor or two or more processors, which are for instance at least partially coupled, for instance via a bus. Processor 601 executes a program code stored in program memory 602 (for instance program code causing mobile device 600 together with network entity 700 to perform one or more of the embodiments of a method according to the present disclosure or parts thereof, when executed on processor 601), and interfaces with a main memory 603. Program memory 602 may also contain an operating system for processor 601. Some or all of memories 602 and 603 may also be included into processor 601.

One of or both of a main memory and a program memory of a processor (e.g. program memory 602 and main memory 603) could be fixedly connected to the processor (e.g. processor 601) or at least partially removable from the processor, for instance in the form of a memory card or stick.

A program memory (e.g. program memory 602) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 603) may for instance be a volatile memory. It may for instance be a DRAM memory, to give non-limiting example. It may for instance be used as a working memory for processor 601 when executing an operating system, an application, a program, and/or the like.

Processor 601 further controls a communication interface 604 (e.g. radio interface) configured to receive and/or transmit data and/or information. For instance, communication interface 604 may be configured to transmit and/or receive radio signals from a radio node, such as a base station. It is to be understood that any computer program code based processing required for receiving and/or evaluating radio signals may be stored in an own memory of communication interface 604 and executed by an own processor of communication interface 604 and/or it may be stored for example in memory 603 and executed for example by processor 601.

Communication interface 604 may in particular be configured to communicate according to a cellular communication system like a 2G/3G/4G/5G or future generation cellular communication system. Mobile device 600 may use radio interface 604 to communicate with a base station, e.g. base station 20 depicted in FIG. 1.

For example, the communication interface 604 may further comprise a BLE and/or Bluetooth radio interface including a BLE transmitter, receiver or transceiver. For example, radio interface 604 may additionally or alternatively comprise a WLAN radio interface including at least a WLAN transmitter, receiver or transceiver.

The components 602 to 604 of mobile device 600 may for instance be connected with processor 601 by means of one or more serial and/or parallel busses.

It is to be understood that mobile device 600 may comprise various other components. For example, mobile device 600 may optionally comprise a user interface (e.g. a touch-sensitive display, a keyboard, a touchpad, a display, etc.).

FIG. 7 is a block diagram of an exemplary embodiment of a network entity, such as base station 20 and/or core network 30 (or a part thereof) of FIG. 1. For instance, network entity 700 may be configured for scheduling and/or transmitting positioning reference signals and the UL FS PMI to the UE, as described above.

Apparatus 700 comprises a processor 701. Processor 701 may represent a single processor or two or more processors, which are for instance at least partially coupled, for instance via a bus. Processor 701 executes a program code stored in program memory 702 (for instance program code causing apparatus 700 to perform alone or together with mobile device 600 embodiments according to the present disclosure or parts thereof), and interfaces with a main memory 703.

Program memory 702 may also comprise an operating system for processor 701. Some or all of memories 702 and 703 may also be included into processor 701.

Moreover, processor 701 controls a communication interface 704 which is for example configured to communicate according to a cellular communication system like a 2G/3G/4G/5G cellular communication system. Communication interface 704 of apparatus 700 may be realized by radio heads for instance and may be provided for communication between base station 20 and UE 10 in FIG. 1.

The components 702 to 704 of apparatus 700 may for instance be connected with processor 701 by means of one or more serial and/or parallel busses.

Mobile device 600 together with communication interface 604 may in particular be configured for receiving reference signals and UL FS PMI from a network entity 700 according to the approach scheme describe herein.

It is to be understood that apparatuses 600, 700 may comprise various other components.

Figure 8:
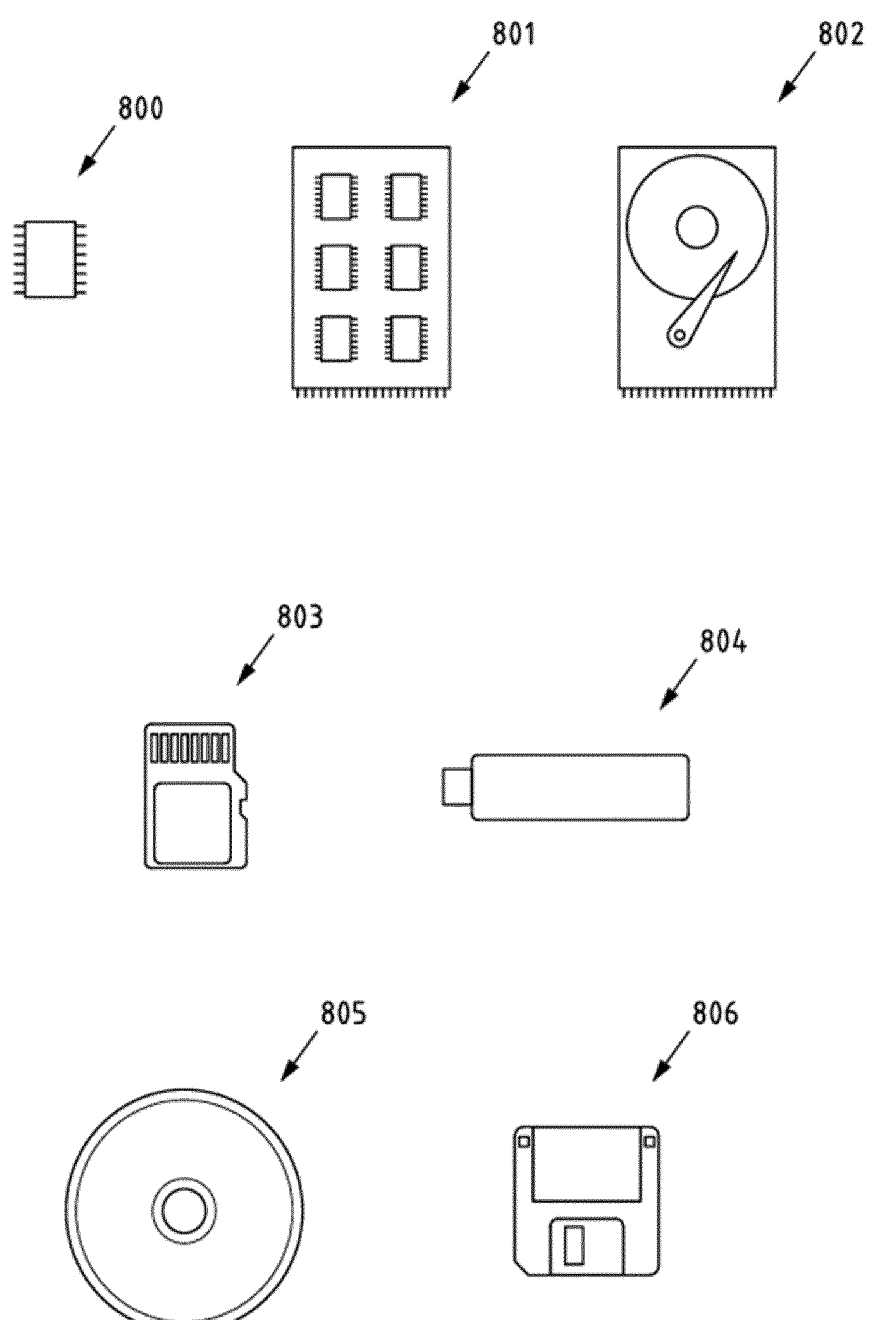
FIG. 8 is a schematic illustration of examples of tangible and non-transitory computer-readable storage media.

FIG. 8 is a schematic illustration of examples of tangible and non-transitory computer-readable storage media according to the present disclosure that may for instance be used to implement memory 602 of FIG. 6 or memory 702 of FIG. 7. To this end, FIG. 8 displays a flash memory 800, which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

The advantages of the proposed solution are in particular as follows:

The proposed invention can be used in order to enable low overhead FS precoder for the Uplink in FDD, consequently, improving performance and link adaptation.

The complexity of the proposed solution is low, making it practical to implement.

The proposed solution does not add any restriction to the CSI reporting framework, in terms of delay or CPU utilization at the UE, consequently, enabling a smooth integration in NR.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 601 and 701 of FIGS. 6 and 7, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

24

LIST OF ABBREVIATIONS

MIMO Multiple Input Multiple Output
MU-MIMO Multi-User Multiple Input Multiple Output
DL Downlink
UL Uplink
RS Reference Signal
FDD Frequency Division Duplex
LoS Line of Sight
NLoS Non-Line of Sight
FS Frequency selective
NR New Radio
FD Frequency Domain
SD Spatial Domain
PS Port Selection
SRS Sounding Reference Signal
SRI SRS Resource Indicator
TPMI Transmitted Precoding Matrix Indicator
SSS Secondary Synchronization signal
PSS Primary Synchronization signal
CSI-RS Channel State Information-Reference Signal
DCI Downlink Control Information
TRP Transmission/Reception point
PUCCH Physical Uplink Control Channel
PUSCH Physical Uplink Shared Channel
PDSCH Physical Downlink Shared Channel
PDCCH Physical Downlink Control Channel
IMR Interference Measurement resource
RRC Radio Resource Control
MAC CE MAC Control Element
IE Information Element
UCI Uplink control Signaling
CSI Channel State Information
CRI CSI-RS Resource Indicator
PMI Precoding Matrix Indicator
UL FS PMI Uplink Frequency Selective Precoding Matrix Indicator
WB Wideband
SB Sub-band
IE Information Element
RSRP Reference Signals Received Power
RSRQ Reference Signal Received Quality

The invention claimed is:

1. An apparatus comprising at least one processor and at least one memory including computer program code, the at least one memory and the computer program code configured to, with the at least one processor, cause the apparatus at least to:

receive, from a network, an uplink reference signal configuration;

receive, from the network, an indication on an uplink reference signal precoding method;

receive, from the network, a downlink reference signal;

estimate uplink channel wideband information based on the received downlink reference signal;

transmit, to the network, an uplink reference signal based on the received uplink reference signal configuration, the estimated uplink channel wideband information and the indicated uplink reference signal precoding method;

receive, from the network, uplink frequency selective precoding information, the uplink frequency selective precoding information having been determined based on the uplink reference signal and the indicated uplink reference signal precoding method; and

construct an uplink frequency selective precoder based on the estimated uplink channel wideband information and the received uplink frequency selective precoding information, wherein the apparatus is further caused to:

receive, from the network, an indication of a timing offset for transmission of the uplink reference signal, wherein the uplink reference signal is transmitted based on the received indication of the timing offset, wherein the timing offset refers to:

a timing offset between the time of the reception of downlink control information triggering the transmission of the downlink reference signal and the time of the transmission of the uplink reference signal, wherein the indicated uplink reference signal precoding method is one of a set of precoding methods comprising:

a precoding method based on an estimated channel spatial support and an estimated channel delay support of the uplink channel, wherein the apparatus is further caused to:

receive an uplink frequency selective precoding configuration via a higher layer wherein construction of the uplink frequency selective precoder is further based on the received uplink frequency selective precoding configuration.

2. The apparatus of claim 1, wherein the indication of the timing offset:

is received via a medium access control configuration element;

selects a timing offset of a list of multiple timing offsets;

refers to a number of slots;

refers to a number of uplink occasions; and comprises an indication of the downlink reference signal.

3. The apparatus of claim 1, wherein the uplink frequency selective precoding configuration comprises information on:

a number of uplink reference signal ports to be used;

a number of bits for quantization of amplitude scaling coefficients;

a number of bits for quantization of co-phasing coefficients;

a port selection sampling size;

a number of frequency domain components; and a number of non-zero coefficients for amplitude scaling and/or co-phasing coefficients.

4. The apparatus of claim 1, wherein:

the downlink reference signal is a synchronization signal block; and the uplink reference signal is a periodic, aperiodic or semi-persistent reference signal.

5. The apparatus of claim 1, wherein the uplink frequency selective precoding information is received via two or more of:

a physical downlink shared channel;

a physical downlink control channel; and a medium access control configuration element.

6. The apparatus of claim 1, wherein the uplink frequency selective precoding information comprises:

an indication of one or more amplitude scaling coefficients for the construction of the uplink frequency selective precoder;

an indication of one or more co-phasing coefficients for the construction of the uplink frequency selective precoder;

a bitmap indicating selected ports to be used for constructing the uplink frequency selective precoder;

a combinatorial indicator indicating selected ports to be used for constructing the uplink frequency selective precoder; and an indication of a first selected port to be used for constructing the uplink frequency selective precoder.

7. A method for a user equipment, the method comprising:

receiving, from a network, an uplink reference signal configuration;

receiving, from the network, an indication on an uplink reference signal precoding method;

receiving, from the network, a downlink reference signal;

estimating uplink channel wideband information based on the received downlink reference signal;

transmitting, to the network, an uplink reference signal based on the received uplink reference signal configuration, the estimated uplink channel wideband information and the indicated uplink reference signal precoding method;

receiving, from the network, uplink frequency selective precoding information, the uplink frequency selective precoding information having been determined based on the uplink reference signal and the indicated uplink reference signal precoding method; and constructing an uplink frequency selective precoder based on the estimated uplink channel wideband information and the received uplink frequency selective precoding information, wherein the method further comprises:

receiving, from the network, an indication of a timing offset for transmission of the uplink reference signal, wherein the uplink reference signal is transmitted based on the received indication of the timing offset, wherein the timing offset refers to:

a timing offset between the time of the reception of downlink control information triggering the transmission of the downlink reference signal and the time of the transmission of the uplink reference signal, wherein the indicated uplink reference signal precoding method is one of a set of precoding methods comprising:

a precoding method based on an estimated channel spatial support and an estimated channel delay support of the uplink channel, wherein the method further comprises:

receiving an uplink frequency selective precoding configuration via a higher layer wherein construction of the uplink frequency selective precoder is further based on the received uplink frequency selective precoding configuration.

8. The method of claim 7, wherein the uplink frequency selective precoding information comprises:

an indication of one or more amplitude scaling coefficients for the construction of the uplink frequency selective precoder;

an indication of one or more co-phasing coefficients for the construction of the uplink frequency selective precoder;

a bitmap indicating selected ports to be used for constructing the uplink frequency selective precoder;

a combinatorial indicator indicating selected ports to be used for constructing the uplink frequency selective precoder; and an indication of a first selected port to be used for constructing the uplink frequency selective precoder.

9. An apparatus comprising at least one processor and at least one memory including computer program code, the at least one memory and the computer program code configured to, with the at least one processor, cause the apparatus at least to:

transmit, to a user equipment, an uplink reference signal configuration;

transmit, to the user equipment, an indication on an uplink reference signal precoding method;

transmit, to the user equipment, a downlink reference signal;

receive, from the user equipment, an uplink reference signal transmitted based on the uplink reference signal configuration, the indicated uplink reference signal precoding method and uplink channel wideband information estimated based on the downlink reference signal;

determine uplink frequency selective precoding information based on the received uplink reference signal and on the indicated uplink reference signal precoding method; and transmit, to the user equipment, the uplink frequency selective precoding information, so that the user equipment can construct an uplink frequency selective precoder based on the estimated uplink channel wideband information and the uplink frequency selective precoding information, wherein the apparatus is further caused to:

transmit an uplink frequency selective precoding configuration via a higher layer, wherein determining the uplink frequency selective precoding information is based on the uplink frequency selective precoding configuration, wherein determining of the uplink frequency selective precoding information comprises:

compare a number of uplink reference signal ports and a number of ports to be used for constructing the uplink frequency selective precoder; and in case the number of ports to be used for constructing the uplink frequency selective precoder is lower than the number of uplink reference signal ports, select ports to be used for constructing the uplink frequency selective precoder from the uplink reference signal ports, wherein the ports to be used for constructing the uplink frequency selective precoder are selected based on a predefined rule.

10. The apparatus of claim 9, wherein determining the uplink frequency selective precoding information takes into account:

an uplink reference signal resource set;

an uplink reference signal frequency density;

an uplink reference signal port selection;

an uplink reference signal resource indication;

a frequency domain component indication;

a strongest port indication; a strongest coefficient indication; and one or more co-phasing coefficients and/or scaling coefficients.

11. The apparatus of claim 9, wherein the uplink frequency selective precoding information comprises:

an indication of one or more amplitude scaling coefficients for the construction of the uplink frequency selective precoder;

an indication of one or more co-phasing coefficients for the construction of the uplink frequency selective precoder;

a bitmap indicating selected ports to be used for constructing the uplink frequency selective precoder;

a combinatorial indicator indicating selected ports to be used for constructing the uplink frequency selective precoder; and an indication of a first selected port to be used for constructing the uplink frequency selective precoder.

* * * * *